June 21, 1960
J. M. FOLZ
2,942,042
ETHYLENE PURIFICATION
Filed Oct. 15, 1957
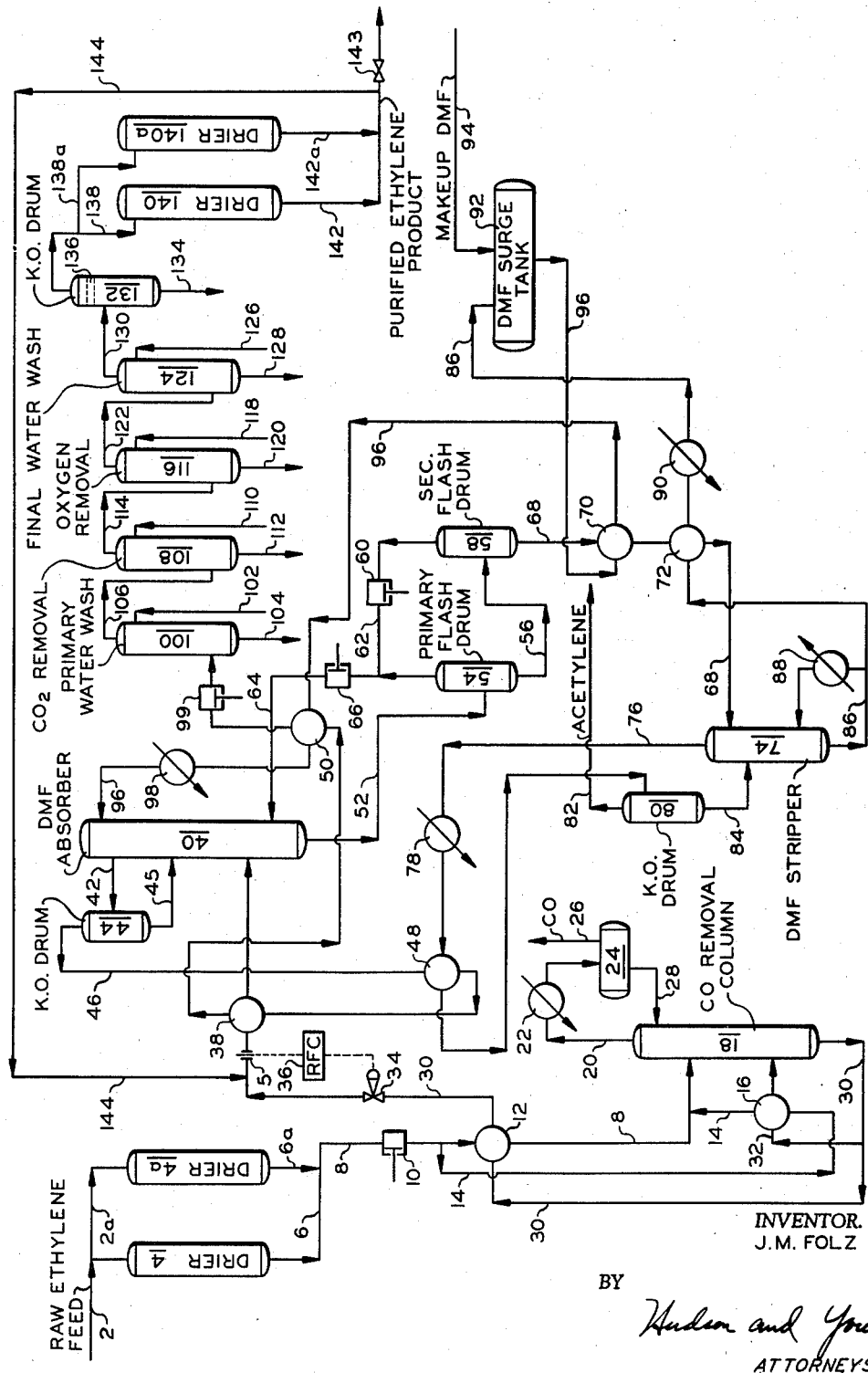
INVENTOR.
J. M. FOLZ
BY
Hudson and Young
ATTORNEYS

United States Patent Office

2,942,042
ETHYLENE PURIFICATION
John M. Folz, Bartlesville, Okla., assignor to Phillips Petroleum Company, a corporation of Delaware Filed Oct. 15, 1957, Ser. No. 690,296

5 Claims. (Cl. 260—677)

This invention relates to the purification of ethylene. In one aspect it relates to the treatment of ethylene containing impurities such as water, acetylene, carbon monoxide, carbon dioxide and oxygen to remove said impurities and provide a purified ethylene product. In another aspect the invention relates to a method of operating a process for treating ethylene to remove contaminants therefrom.

Ethylene in recent years has found increasing importance in the petro-chemical industries. For example, it is frequently used as a chemical intermediate in the preparation of such materials as acetaldehyde, acetic acid, ethanol, acetylene, ethylene glycol, ethylene oxide, etc. By far the largest use of ethylene, however, both present and prospective, lies in the polymerization field and specifically in the catalytic polymerization of ethylene to normally solid polymers. Ethylene, while naturally occurring in petroleum, is obtained principally by the dehydrogenation of low-boiling paraffin hydrocarbons such as ethane, propane, butane, etc. In the process of manufacture of ethylene from paraffins various side products are formed in small quantities. These include such materials as acetylene, carbon monoxide, carbon dioxide, and oxygen. Due to the sensitivity of the various polymerization catalysts to these materials it is desirable when utilizing ethylene as a feed material in the polymerization process to first remove any side products.

In one process the removal of undesirable compounds from the raw ethylene is provided by passing the feed material through a series of treating operations in which the ethylene is contacted with various chemical treating agents. Some of the chemicals used are expensive and require extensive treatment, involving heating and cooling operations, to effect their recovery for reuse in the process. The over-all purification process thus requires a substantial expenditure of thermal energy due to the large number of process streams which must be heated or cooled during the operation. In order to reduce the consumption of energy, where possible various process streams are utilized for heating and cooling. The resulting process comprises a complex network of heat exchangers, coolers and condensers interrelated in such a manner that changes in the operation of one exchanger or a change in the quantity of one process stream can effect the temperatures of a number of exchangers or process streams.

The quantity of ethylene required, for example, when this material is being used as a feed to a polymerization process can fluctuate substantially over a period of time. Customarily the treating process is operated to supply only the required amount of purified ethylene; however, in view of the interrelationship of the various heat exchange operations it is not possible to obtain the desired purification if any of the process streams are varied to any substantial degree.

It is an object of this invention to provide an improved process for the purification of ethylene.

Another object of the invention is to provide a process for increasing the efficiency of purification of ethylene to remove contaminants therefrom.

Still another object of the invention is to provide a process for the purification of ethylene in which heat exchange and treating operations are carried out at maximum efficiency.

Yet another object of the invention is to provide a process for the purification of ethylene wherein fluctuations in the quantity of desired product do not effect the efficiency of the treating process.

These and other objects of the invention will become more readily apparent from the following detailed description and discussion.

The foregoing objects are attained broadly by operating the ethylene purification process such that the treating materials which are utilized in heat exchange are maintained at a substantially constant flow rate and recycling excess purified ethylene to the feed material whereby the ethylene feed rate is maintained substantially constant.

As used herein the term "substantially constant" means "constant, within the capabilities of conventional flow and control instrumentation."

The invention is best described by reference to the accompanying drawing which is a diagrammatic illustration of an ethylene treating and purification unit comprising a carbon monoxide removal column, and acetylene absorber, water wash columns, a carbon dioxide removal column, and oxygen removal column, inlet and exit dryers and associated heat exchange equipment, conduits, etc. suitable for carrying out the invention.

Referring to the drawing, raw ethylene feed prepared by the pyrolysis of ethane is passed through a dryer for the removal of water. In addition to water the ethylene feed contains, as impurities, quantities of acetylene, carbon monoxide, carbon dioxide and oxygen. Removal of water from the ethylene feed is provided by contacting this material with a suitable drying agent, such as bauxite, alumina, silica gel etc. Since the drying operation is customarily carried out as a batch process, it is desirable to provide a plurality of dryers whereby one or more of the dryers can be regenerated, emptied, filled, etc., while another dryer is in operation, thereby providing for continuous drying of the ethylene feed. In this particular operation dryers 4 and 4a are provided with the feed material being passed through dryer 4, with dryer 4a in standby condition. While drying can be carried out over a range of temperature best results are provided at lower temperatures and preferably this operation is carried out at normal atmospheric temperatures.

After leaving dryer 4 the ethylene feed, which is substantially freed from water, is passed through conduit 8 and compressor 10 and introduced to carbon monoxide removal column 18. This column can be a conventional fractionating column containing trays or baffles, or can be a packed tower. In this particular example the tower is packed with Raschig rings. In order to effect removal of carbon monoxide from the ethylene feed it is necessary that the temperature in column 18 be reduced to below the boiling point of ethylene so that this material is condensed. The desired reduction in temperature is effected in part by passing the ethylene feed through exchangers 12 and 16 and in part by refluxing the column with overhead material which is reduced in temperature by propane refrigeration in condenser 22. It is possible to operate over a range of temperature in the CO removal column by varying the pressure therein, with the only limitation being that the temperature is sufficiently low to maintain the ethylene in the liquid state. Usually this column is operated with a top temperature between a temperature of about −5 and about −20° F. and a pressure of between about 275 and about 325 p.s.i.g.

Carbon monoxide containing gases pass overhead from column 18 through conduit 20 and condenser 22 and enter an accumulator 24. The liquid condensate from the accumulator is recycled to the column through conduit 28 as reflux and uncondensed carbon monoxide gas is withdrawn from conduit 26. The tower bottoms which comprise the ethylene feed, now substantially freed from water and carbon monoxide, are removed through conduit 30. A portion of the bottoms are returned to the column through conduit 32 and exchanger 16 and serve to reboil the column with heat picked up from the ethylene feed. The remainder of the column bottoms are passed through exchanger 12 in heat exchange with the ethylene feed then through exchanger 38 wherein they are further heated in indirect heat exchange with the overhead from the dimethylformamide absorber 40 and are thereafter introduced to said absorber.

Before entering exchanger 38 the bottoms are joined by purified recycle ethylene through conduit 144. The two streams are proportioned so that the quantity of material passing through exchanger 38 and into the absorber remains substantially constant at all times. The amount of recycle ethylene passing through conduit 144 depends on the quantity of purified ethylene withdrawn as product through valve 143, thus as the ethylene product increases or decreases a corresponding change in flow of recycle ethylene results. The total ethylene feed to exchanger 38 passes through an orifice 5 to which there is connected a flow control 36 which in turn it connected to a control valve 34 in conduit 30. When the flow rate through conduit 144 varies the flow through orifice 5 also varies. The latter change in flow is transmitted to flow controller 36 which in turn transmits a signal to control valve 34 which opens or closes to adjust the flow rate through conduit 30, whereby the flow rate through orifice 5 is returned to its previous level. Thus, the total ethylene feed rate is maintained substantially constant immaterial of variations in the net yield of purified ethylene product.

Absorber 40 is utilized to effect removal of acetylene from the ethylene feed. This vessel can be a conventional tray-type fractionating tower or can contain various types of packing materials. In this specific instance, the absorber is a tray type vessel. The ethylene feed entering the absorber is contacted with dimethyl formamide (DMF) which serves as an absorbent for acetylene present in said feed. The feed is introduced in the bottom portion of the absorber and passes upwardly countercurrent to the DMF which enters the absorber through conduit 96. Since absorption is aided by low temperatures this process is preferably carried out in a temperature range below atmospheric, usually between about −20 and about 56° F. Elevated pressures are necessary in order to retain the acetylene in the absorbent, for example between about 275 and about 325 p.s.i.g. The quantity of absorbent required to effect removal of the acetylene is dependent on the amount of acetylene present in the ethylene feed and usually is maintained at a rate between about 75 and about 175 pounds per pound of acetylene.

In passing through the absorber the dimethylformamide absorbs not only acetylene but also a portion of the ethylene from the feed. Recovery of the latter material is provided by passing the absorber bottoms through a primary flash drum 54 and a secondary flash drum 58 wherein successive reductions in pressure are made. The gases which are released from the flash drums are concentrated in ethylene and are returned to the absorber through conduits 62 and 64, and compressors 60 and 66. The primary flash drum is usually operated at a pressure in the range of between about 50 and about 75 p.s.i.a. and the secondary flash drum is operated between about 0 and about 30 p.s.i.a.

The liquid from the secondary flash drum, which comprises DMF containing acetylene, is removed through conduit 68, passed through exchangers 70 and 72 wherein it is heated in indirect heat exchange with two DMF streams and then introduced to DMF stripper 74. The heat added to this stream acts to release acetylene from the DMF and gas passes overhead through conduit 76 and cooler 78, is then contacted in indirect heat exchange with overhead from the DMF absorber and further cooled in exchanger 48 whereby any DMF carried overhead from the stripper is condensed. The mixture of condensate and gas enters a knock-out drum 80, from which the acetylene is withdrawn through conduit 82. The liquid from the knock-out drum is returned to the DMF stripper through conduit 84 and acts as a reflux material. The DMF stripper is usually operated at a pressure in the same range as the secondary flash drum and at a temperature of between about 125 and about 400° F. The stripper bottoms, comprising substantially pure DMF are withdrawn through conduit 86 cooled in indirect heat exchange with secondary flash drum bottoms in exchanger 72, further cooled in water cooler 90 and introduced to DMF surge tank 92. This material, which is combined with any required make-up DMF introduced through conduit 94, comprises the absorbent feed to DMF absorber 40. As required the DMF is withdrawn from the surge tank through conduit 96, cooled in heat exchange with the secondary flash drum bottoms in exchanger 70, passed through exchanger 50, in indirect heat exchange with the DMF absorber overhead, for further cooling and finally cooled in propane exchanger 98, after which it is introduced to the DMF absorber through conduit 96 as previously noted.

The DMF absorber overhead vapor, which comprises ethylene feed substantially free of water, carbon monoxide and acetylene passes into a knock out drum 44 where any entrained liquid is removed, the latter being returned to the absorber through conduit 45. The gases from the knock out drum are passed through conduit 46, exchanger 48, exchanger 38, and exchanger 50, after which they are compressed in compressor 99 and introduced to a series of towers for the removal of other components from the ethylene feed. These towers comprise a primary wash tower 100, followed by a carbon dioxide removal tower 108, an oxygen removed tower 116, a final water wash tower 124, a knock out drum 132 and driers 140 and 140A. During passage of the ethylene gas through these towers the primary water wash is utilized to remove DMF, caustic is used to remove carbon dioxide, pyrogallol is used to remove oxygen, the final water wash is used to remove pyrogallol and the driers serve to remove any water present in the purified ethylene product. The material leaving the driers is divided into two portions with one portion being yielded through valve 143 as product and the other being recycled to the ethylene feed through conduit 144. It is necessary that the carbon dioxide and oxygen removal operations be carried out at an elevated pressure in order to retain these contaminants in the treating materials in which they are absorbed. Usually these treating operations are carried out at a pressure in the range of between about 500 and about 575 p.s.i.a. Since increasing temperatures require more elevated pressures it is desirable that the carbon dioxide and oxygen removal be carried out at low temperatures usually not substantially greater than that about atmospheric temperature. The quantities of treating agents employed depend on the amount of contaminants which must be removed from the ethylene. In the case of carbon dioxide removal the caustic is preferably introduced at a rate of between about 45 and about 175 pounds per pound of carbon dioxide present in the ethylene feed. In the oxygen removal step the pyrogallol is preferably maintained at a rate between about 2500 and about 5000 pounds per pound of oxygen present in the ethylene stream.

In each of the preceding operations the quantity of DMF employed is maintained substantially constant and the total ethylene feed is maintained substantially constant by suitably proportioning the fresh feed and recycle ethylene.

The preceding discussion has been directed to a preferred embodiment of the invention; however, this is not intended in any limiting sense and it is within the scope of the invention to employ other methods and apparatus within the skill of the art. Thus, to effect the purpose of the invention it is possible to employ treating agents other than those specifically set forth in the discussion of the drawing. For example removal of acetylene from the ethylene feed can be carried out by using conventional absorbent materials, such as acetone, butyrolactone, 2-pyrollidone, etc., removal of carbon monoxide by the use of copper ammonium acetate or formate, and the removal of carbon dioxide by the use of mono-, di- or triethanol amines, potassum carbonate, portassium hydroxide, sodium hydroxide, etc.

The process of this invention provides advantages over the previous methods of operation in that it is possible, since the flow rate of the ethylene feed and the DMF absorbent are maintained constant, to design vessels, heat exchangers, pumps, etc., to operate at optimum efficiencies. It is also possible by virtue of maintaining the various flow rates constant to provide maximum removal of contaminants and side products from the ethylene feed.

The ethylene treated in the method of this invention is obtained usually by the pyrolysis of low boiling paraffin hydrocarbons such as ethane, propane, butane and mixtures thereof. The reaction is carried out at elevated temperatures, for example, when ethane is utilized as a feed material the reaction takes place in the range of 1400 to 1600° F. When higher boiling hydrocarbons are pyrolyzed it is found that the reaction proceeds at somewhat lower temperatures. Usually it is desirable to operate with low pressures since higher pressures have an adverse effect on the reaction equilibrium. The reaction proceeds rapidly therefore it is preferable to maintain a short reaction residence time, usually between about 0.5 and about 0.8 sec. In order to minimize coking and aid in obtaining the desired residence time, it is customary to dilute the feed material with an inert gas, such as steam.

The following example is presented in illustration of a commercial application of one embodiment of the invention.

*Example*

| Flows | Lb./hr. |
|---|---|
| Raw ethylene feed (2) | 3500 |
| Composition: | |
| $C_2H_4$ ---------- wt. percent -- 95.89 | |
| $C_2H_2$ ---------- wt. percent -- 1.40 | |
| CO ---------- p.p.m -- 24 | |
| $CO_2$ ---------- wt. percent -- 0.29 | |
| $CH_4$ ---------- wt. percent -- 0.21 | |
| $C_2H_6$ ---------- wt. percent -- 2.21 | |
| Recycle ethylene (144) | 100 |
| Feed to CO removal (8) | 3600 |
| Composition: | |
| $C_2H_4$ ---------- wt. percent -- 95.81 | |
| $C_2H_2$ ---------- wt. percent -- 1.40 | |
| CO ---------- p.p.m -- 23 | |
| $CO_2$ ---------- wt. percent -- 0.30 | |
| $CH_4$ ---------- wt. percent -- 0.22 | |
| $C_2H_6$ ---------- wt. percent -- 2.27 | |
| Feed to acetylene removal (30) | 3600 |
| Composition: | |
| $C_2H_4$ ---------- wt. percent -- 95.83 | |
| $C_2H_2$ ---------- wt. percent -- 1.43 | |
| $CO_2$ ---------- wt. percent -- 0.31 | |
| $CH_4$ ---------- wt. percent -- 0.15 | |
| $C_2H_6$ ---------- wt. percent -- 2.28 | |
| DMF to absorber (96) | 6215 |
| Composition: | |
| $C_2H_4$ ---------- wt. percent -- 9.11 | |
| $C_2H_6$ ---------- wt. percent -- 0.22 | |
| $CH_4$ ---------- wt. percent -- 0.02 | |
| $CO_2$ ---------- wt. percent -- 0.03 | |
| DMF ---------- wt. percent -- 90.62 | |
| Feed to $CO_2$ removal (114) | 3500 |
| Composition: | |
| $C_2H_4$ ---------- wt. percent -- 97.20 | |
| $CO_2$ ---------- wt. percent -- 0.31 | |
| $CH_4$ ---------- wt. percent -- 0.15 | |
| $C_2H_6$ ---------- wt. percent -- 2.34 | |
| Feed to $O_2$ removal (114) | 3490 |
| Composition: | |
| $C_2H_4$ ---------- wt. percent -- 97.40 | |
| $CH_4$ ---------- wt. percent -- 0.15 | |
| $C_2H_6$ ---------- wt. percent -- 2.34 | |
| Water ---------- wt. percent -- 0.11 | |
| Feed to driers (138) | 3490 |
| Composition: | |
| $C_2H_4$ ---------- wt. percent -- 97.40 | |
| $CH_4$ ---------- wt. percent -- 0.15 | |
| $C_2H_6$ ---------- wt. percent -- 2.34 | |
| $H_2O$ ---------- wt. percent -- 0.11 | |
| Net ethylene product | 3386 |
| Composition: | |
| $C_2H_4$ ---------- wt. percent -- 97.51 | |
| $CH_4$ ---------- wt. percent -- 0.15 | |
| $C_2H_6$ ---------- wt. percent -- 2.34 | |

| | Temperatures, ° F. |
|---|---|
| Raw ethylene feed (8) | 70 |
| CO removal column (18): | |
| Top | -15 |
| Bottom | -15 |
| Combined feed to exchanger 38 | 70 |
| Combined feed to DMF absorber 40 | 56 |
| DMF absorber (40): | |
| Top | 0 |
| Bottom | 38 |
| Primary flash drum (54) | 11 |
| Secondary flash drum (58) | 4 |
| Secondary flash drum bottoms: | |
| To exchanger 70 | 4 |
| To exchanger 72 | 94 |
| To DMF stripper 74 | 150 |
| DMF stripper (74): | |
| Top | 150 |
| Bottom | 346 |
| DMF stripper overhead to exchanger (98) | 150 |
| KO drum (80) | 10 |
| DMF stripper bottoms to exchanger 90 | 288 |
| DMF surge tank (92) | 100 |
| Surge DMF: | |
| To exchanger 50 | 29 |
| To exchanger 98 | 24 |
| To DMF absorber 40 | 20 |
| DMF absorber overhead: | |
| To exchanger 38 | 2 |
| To exchanger 50 | 13 |
| To primary water wash column (100) | 100 |
| Primary water wash column (110) | 100 |
| $CO_2$ removal column (108) | 100 |
| Oxygen removal column (116) | 100 |
| Final water wash column (124) | 100 |
| Driers (140 and 140a) | 100 |

|                              | Pressures, p.s.i.a. |
|------------------------------|---------------------|
| CO removal column (18)       | 310                 |
| DMF absorber (40)            | 300                 |
| DMF stripper (74)            | 20                  |
| Primary flash drum (54)      | 65                  |
| Secondary flash drum (58)    | 20                  |
| Primary water wash column (100) | 550              |
| $CO_2$ removal column (108)  | 550                 |
| Oxygen removal column (116)  | 550                 |
| Final water wash column (124)| 534                 |

It is apparent from the preceding example that temperatures of the various process streams, particularly the ethylene feed and the DMF absorbent, in various parts of the process are closely interrelated and a change in flow rate or temperature of either stream would have substantial and cumulative effect on other temperatures and flow rates.

Having thus described the invention by providing a specific example thereof, it is to be understood that no undue limitations or restrictions are to be imposed by reason thereof and that many variations and modifications are within the scope of the invention.

I claim:

1. In a process wherein ethylene is purified in a purification zone and, in conjunction with the purification, is passed through a heat exchange system wherein it is subjected to indirect heat exchange with at least one material which has passed through said purification zone, so that variation of the rate of flow of ethylene has an adverse effect upon the heat exchange, and the amount of finally purified ethylene withdrawn as product varies, the improvement which comprises recycling, to said heat exchange zone, that part of the finally purified ethylene not withdrawn as product, and proportioning thus recycled ethylene, with respect to ethylene feed entering the process, to maintain substantially constant the total flow rate of ethylene passing through said heat exchange system.

2. In a process wherein ethylene is purified in a purification zone by contact with an absorbent which selectively dissolves impurities from said ethylene, said absorbent being supplied to said purification zone at a substantially constant rate, and, in conjunction with the purification, the ethylene is passed through a heat exchange system wherein it is subjected to indirect heat exchange with ethylene withdrawn from said purification zone after contact with absorbent and subsequently subjected to indirect heat exchange with said absorbent prior to entry of said absorbent into said purification zone, so that variation of the rate of flow of ethylene has an adverse effect upon the heat exchange, and the amount of finally purified ethylene withdrawn as product varies, the improvement which comprises recycling to said heat exchange system, that part of the finally purified ethylene not withdrawn as product, and proportioning thus recycled ethylene, with respect to ethylene feed entering the process, to maintain substantially constant the total flow rate of ethylene passing through said heat exchange system.

3. A process according to claim 2 wherein said absorbent is selected from a group consisting of copper ammonium acetate and copper ammonium formate and the impurity absorbed is carbon monoxide.

4. A process according to claim 2 wherein said absorbent is a basic reagent selected from the group consisting of monoethanolamine, diethanolamine, triethanolamine, potassium carbonate, potassium hydroxide, and sodium hydroxide, and the impurity absorbed is carbon dioxide.

5. In a process wherein ethylene is purified in a purification zone by contacting with dimethylformamide which selectively dissolves acetylene from said ethylene and, in conjunction with the purification, the ethylene is passed through a heat exchange system wherein the purified ethylene stream withdrawn from contact with said dimethylformamide is subjected to heat exchange with acetylene recovered from solution in said dimethylformamide by stripping, then subjected to heat exchange with the impure ethylene feed entering the system, and then with said dimethylformamide entering the purification zone, said dimethylformamide being supplied to said purification zone at a substantially constant rate, in which heat exchange system variation of the rate of flow of ethylene will have an adverse effect upon the heat exchange, and the amount of finally purified ethylene withdrawn as product varies, the improvement which comprises recycling, to said heat exchange system, that part of the finally purified ethylene not withdrawn as product, and proportioning thus recycled ethylene, with respect to ethylene feed entering the process, to maintain substantially constant the total flow rate of ethylene passing through said heat exchange system.

References Cited in the file of this patent

UNITED STATES PATENTS

| 2,474,006 | Maycock | June 21, 1949 |
| 2,500,353 | Gantt | Mar. 14, 1950 |
| 2,673,829 | King | Mar. 30, 1954 |
| 2,736,756 | Elgin | Feb. 28, 1956 |
| 2,781,293 | Ragatz | Feb. 12, 1957 |
| 2,804,488 | Cobb | Aug. 27, 1957 |